United States Patent [19]

Tabet

[11] Patent Number: 4,497,417

[45] Date of Patent: Feb. 5, 1985

[54] ROTATABLE SPLIT HANDLED COOKING UTENSIL

[76] Inventor: Michael A. Tabet, 1302 Pamela Pl., Norfolk, Va. 23513

[21] Appl. No.: 477,947

[22] Filed: Mar. 23, 1983

[51] Int. Cl.³ .............................................. B65D 25/28
[52] U.S. Cl. .............................. 220/94 R; 215/100 A
[58] Field of Search ................ 220/94 R; 215/100 A; 16/110 R, 110 A, 114 R, 114 A; 294/145, 168; 403/DIG. 1, 344

[56] References Cited

U.S. PATENT DOCUMENTS

| 498,195 | 5/1893 | Spahmer | 220/94 R |
| 686,422 | 11/1901 | Sherd | 16/114 A |
| 2,242,779 | 5/1941 | Erdos | 16/110 A X |
| 2,609,563 | 9/1952 | Budelman | 16/114 A |
| 2,697,642 | 12/1954 | Rudy | 403/DIG. 1 X |
| 2,731,663 | 1/1956 | Thompson | 403/DIG. 1 X |
| 3,059,809 | 10/1962 | Thompson | 220/94 R |

FOREIGN PATENT DOCUMENTS 561666   5/1944   United Kingdom ............ 220/94 R

Primary Examiner—Stephen Marcus
Assistant Examiner—Robert Petrik
Attorney, Agent, or Firm—Bernard, Rothwell & Brown

[57] ABSTRACT

A cooking utensil has a handle split into two sections which are permanently attached, but rotatable with regard to the periphery of the utensil so that the two sections of the split handle may be grasped by the user to lift the cooking utensil with both hands. Stops are provided to limit the maximum movement of the split handles and magnets may be utilized to hold the split handles together thus forming a single handle.

5 Claims, 4 Drawing Figures

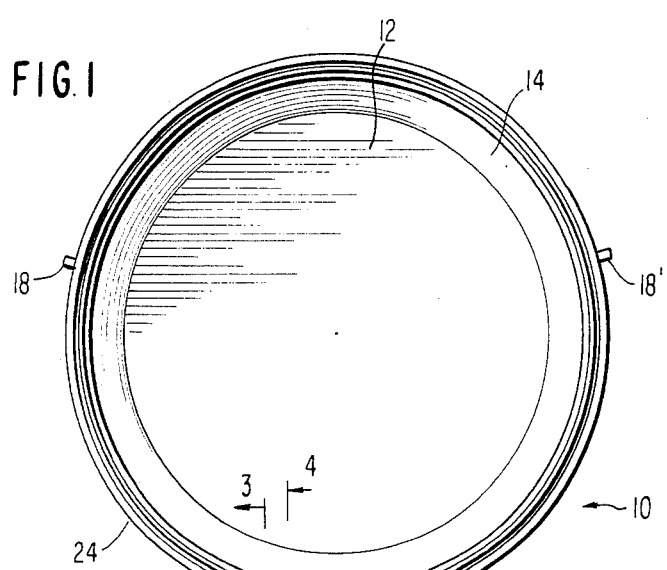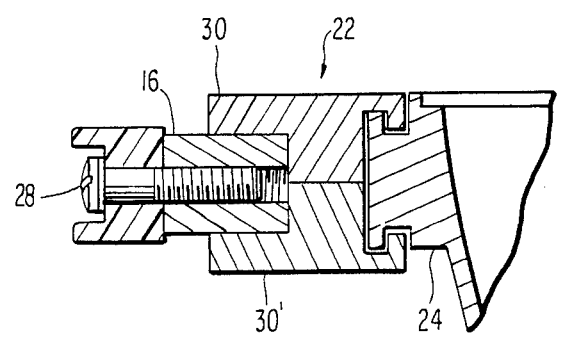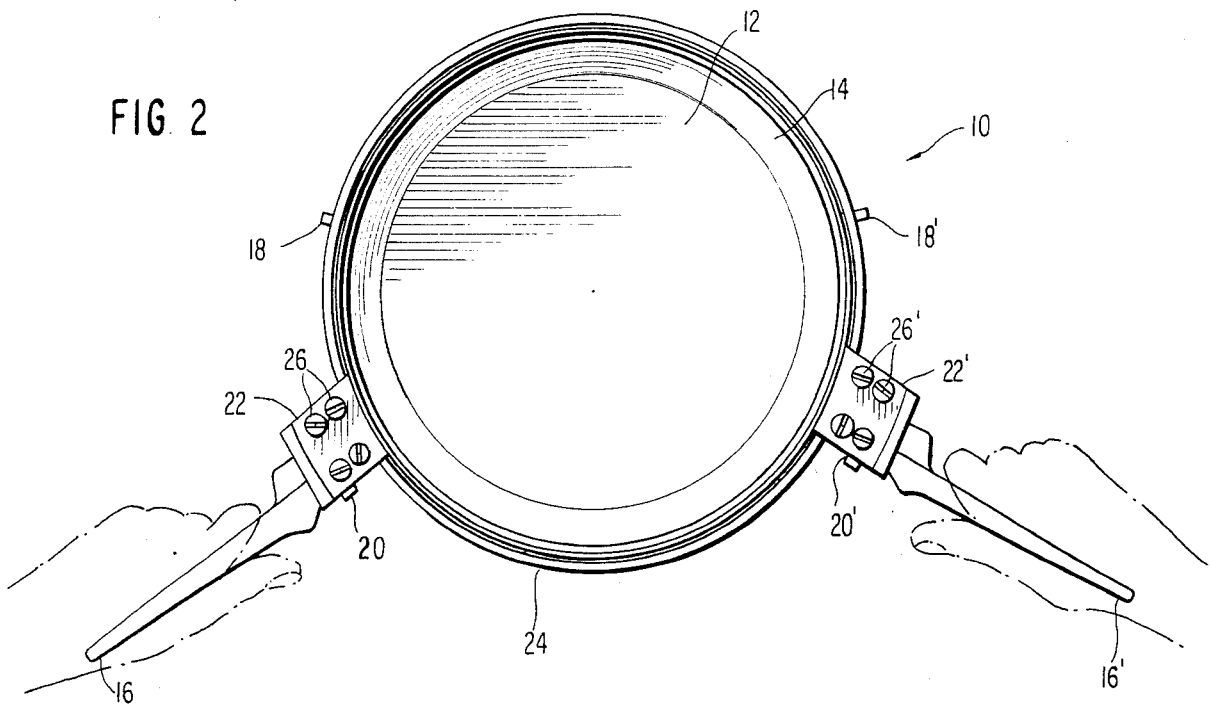

ROTATABLE SPLIT HANDLED COOKING UTENSIL

BACKGROUND OF THE INVENTION

Field of the Invention

This invention relates to improvements in cookware and particularly to handle means for grasping such cookware.

Description of the Prior Art

The art of cookware, particularly cooking utensils, is old and well worked. Various modes of detachable handles for pans and other cookware are known. For example, see U.S. Pat. Nos. 324,671 and 749,753. The former patent shows a pair of detachable handles for frying pans connected in dove-tail slots. It is also known to provide a handle that may be detachably connected and rotated in a cooking utensil, for example, as shown in U.S. Pat. Nos. 625,955 and 2,250,709. Handles which are split to cover an existing handle are known as shown in U.S. Pat. No. 2,609,653.

Even with this prior art, however, there exists a need in the field for an arrangement whereby a cooking utensil, particularly a relatively heavy cooking utensil, can be adapted to be grasped with both hands for stability and security or can be held conventionally by a single handle. Older people in the population may cook and appreciate fine cookware, however, due to lack of strength in the hands and arms or to conditions such as arthritis or the like, they sometimes are unable to handle heavy cookware with a single handle. Cookware which could be convertible from a single handle to a pair of handles positioned on opposite sides of the cooking pan would have a significant appeal and would be very beneficial to users of cookware and others who find it difficult to handle heavy cookware by using a single handle, particularly when loaded with hot contents.

SUMMARY OF THE INVENTION

This invention provides a cooking utensil having a rotatable split handle construction such that the split handles can be held together as in conventional cookware, or can be spread apart and slid around the edges of the pan to a stop position such that the pan can be held by gripping the handles from opposite sides of the pan. The split handles may be held together by magnets.

BRIEF DESCRIPTION OF THE DRAWINGS

In the accompanying diagram:

FIG. 1 is a top plan view of the cooking utensil of this invention with the split handles disposed in the single handle configuration;

FIG. 2 is a top plan view of the cooking utensil of this invention with the split handles disposed in the split handle configuration;

FIG. 3 is an enlarged sectional view taken on line 3—3 of FIG. 1;

FIG. 4 is an enlarged sectional view taken on line 4—4 FIG. 1.

DESCRIPTION OF THE PREFERRED EMBODIMENT

Referring now to the drawing, a cooking utensil generally indicated at 10 is shown in FIG. 1. The cooking utensil 10 is comprised of a cooking surface 12 and vertically extending side walls 14. Split handles 16, 16' are rotably movable from the position shown to a position adjacent stops 18, 18'. The handles are mounted on track followers 22, 22' which move on a track means 24. Screws 26, 26' secure the handles and the followers.

As shown in FIG. 1, the split handles 16, 16' of the cooking utensil 40 are juxtapositioned to provide a single handle configuration. In this configuration, the split handles 16, 16' are brought together such that the user of the cooking utensil 10 may lift the utensil by grasping the split handles 16, 16' with one hand.

As shown in FIG. 2, the split handles 16, 16' of the cooking utensil 10, are rotatably separated to provide a split handle configuration. In this configuration, the split handles 16, 16' are spread apart such that the user of the utensil 10 may lift the utensil by grasping the split handles 16, 16' from approximately opposite sides of the utensil. Also as shown in FIG. 2, stops 18, 18' are disposed on the track means 24. The stops 18, 18' restrict the movement of the split handles 16, 16' on the track means 24 such that the split handles 16, 16' may be spread apart only to the extent allowed by the stops 18, 18'.

The connection of the track follower 22, 22' and the track means 24 is shown in more detail in FIGS. 3 and 4. The track means 24 is permanently attached to the side wall 14 of the cooking utensil 10 and forms a continuous annular ring around the side wall 14. The track followers 22, 22' are adapted to be permanently and movably attached to the track means 24 preferably by a complimentary channel-shaped connection.

As shown in FIG. 3, the track followers 22, 22' are comprised of an upper piece 30 and a lower piece 30'. The upper and lower pieces 30, 30' are permanently held together by screws 26.

As shown in FIG. 4, the split handles 16, 16' are permanently attached to the track followers 22, 22' by a screw 28.

In a preferred embodiment of this invention, as shown in FIG. 2, oppositely charged magnets 20, 20' are attached to the split handles 16, 16' and will magnetically hold the split handles together for use as a single handle unless they are separated by the user for use as split handles.

In another embodiment of this inventor, the track means 24 may be removed from the side wall 14 for reception of a cover for the vessel. Other variations apparent to those of skill in the art are within the scope of the invention.

I claim:

1. A cooking utensil of the type having a cooking surface with a side wall extending upwardly therefrom, the improvements comprising:
   (a) a pair of split handles,
   (b) means on one end of each handle for permanently and slidably attaching the same to the wall of the cooking utensil, and means on the side wall, operatively associated with said means on one end of each handle, which allow the split handle portions slidably attached to the side wall to slide to a position adjacent one another with a function as a single handle, and to positions opposite each other around the periphery of the cooking surface so as to allow a user to lift and manipulate the cooking utensil by grasping both split handles; and
   (c) securing means which hold the split handles together for use as a single handle unless separated by a user for use as split handles.

2. A cooking utensil as defined in claim 1 wherein said means in the side wall comprise a track means defined on the upper periphery of the wall of the cooking utensil, and said means on one end of each handle comprise a track follower permanently attached to the track on the end of each of the split handles.

3. A cooking utensil as in claim 2 wherein the track and track follower are complimentary channel-shaped.

4. A cooking utensil as in claim 1 wherein said means on the side wall comprise a track means defined on the upper periphery of the wall of the cooking utensil, and said means on one end of each handle comprise a track follower permanently attached to the track on the ends of each of the handles; and further comprising stops on the track means for stopping and controlling the movement of the split handles.

5. A cooking utensil as in claim 4 wherein the track means are removed from the top edge of the side wall for reception of a cover.

* * * * *